(12) United States Patent
Zhang et al.

(10) Patent No.: US 10,909,554 B2
(45) Date of Patent: Feb. 2, 2021

(54) ANALYZING BIG DATA TO DETERMINE A DATA PLAN

(71) Applicant: Verizon Patent and Licensing Inc., Arlington, VA (US)

(72) Inventors: Fengping Zhang, Burlington, MA (US); Susan Kelly, Maynard, MA (US); Jian Huang, Sudbury, MA (US); Fnu Bongu Huma Shankar Rao, Lexington, MA (US); Guanrao Chen, Sudbury, MA (US); Mohammad Zohaib Akmal, Framingham, MA (US); Harshal Khandare, Waltham, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 475 days.

(21) Appl. No.: 15/469,115

(22) Filed: Mar. 24, 2017

(65) Prior Publication Data
US 2018/0276689 A1 Sep. 27, 2018

(51) Int. Cl.
*G06Q 30/02* (2012.01)
*G06Q 30/06* (2012.01)

(52) U.S. Cl.
CPC ..... *G06Q 30/0201* (2013.01); *G06Q 30/0631* (2013.01)

(58) Field of Classification Search
CPC ............ G06Q 30/0201; G06Q 30/0631
See application file for complete search history.

(56) References Cited

U.S. PATENT DOCUMENTS

| | | | | |
|---|---|---|---|---|
| 5,815,566 A | * | 9/1998 | Ramot | H04M 3/36 379/210.01 |
| 7,260,837 B2 | * | 8/2007 | Abraham | G06Q 20/3821 726/4 |
| 7,987,123 B1 | * | 7/2011 | Gaffney | G06Q 10/0631 705/34 |
| 8,634,407 B2 | * | 1/2014 | Mohammed | H04W 24/08 370/351 |

(Continued)

OTHER PUBLICATIONS

"Optimizing market segmentation for a global mobile phone provider for both targeting and insight", M O'Regan, K Ashok . . . —Journal of . . . , 2011, journalofadvertisingresearch.com (Year: 2011).*

(Continued)

*Primary Examiner* — Jonathan G Sterrett

(57) ABSTRACT

A device can receive, from a set of storage devices, first information relating to one or more pilot data plans that are associated with one or more first groups of user devices. The device can receive, from the set of storage devices, second information relating to one or more live data plans that are associated with one or more second groups of user devices. The device can analyze the first information and/or the second information to identify one or more patterns of information. The one or more patterns can include a data usage pattern, a demographic information pattern, a revenue generation pattern, and/or a user interest pattern. The device can perform one or more actions, including generating a new data plan, identifying one or more user accounts as candidates for a new data plan, and/or transmitting, via a network, information relating to the new data plan.

20 Claims, 12 Drawing Sheets

(56) References Cited

U.S. PATENT DOCUMENTS

| | | | | |
|---|---|---|---|---|
| 8,917,611 | B2* | 12/2014 | Poon | H04W 24/04 370/242 |
| 8,938,058 | B2* | 1/2015 | Soundar | H04M 3/5183 379/211.02 |
| 10,282,759 | B1* | 5/2019 | King | G06Q 30/0276 |
| 2007/0112615 | A1* | 5/2007 | Maga | G06Q 10/0637 705/7.34 |
| 2009/0012841 | A1* | 1/2009 | Saft | G06Q 30/02 705/7.29 |
| 2009/0150489 | A1* | 6/2009 | Davis | G06Q 10/107 709/204 |
| 2010/0318486 | A1* | 12/2010 | Stafford | G06Q 30/02 706/47 |
| 2012/0084120 | A1* | 4/2012 | Hirsch | G06Q 30/02 705/7.32 |
| 2012/0315881 | A1* | 12/2012 | Woloshyn | G06F 3/0488 455/412.2 |
| 2013/0325587 | A1* | 12/2013 | Kothari | G06Q 30/0243 705/14.42 |
| 2015/0046214 | A1* | 2/2015 | Jain | G06Q 30/0201 705/7.29 |
| 2015/0142590 | A1* | 5/2015 | Gray | G06Q 30/0631 705/21 |
| 2015/0178784 | A1* | 6/2015 | Oliver | G06Q 30/0267 705/14.64 |
| 2015/0324811 | A1* | 11/2015 | Courtright | H04W 4/06 705/7.32 |
| 2016/0034953 | A1* | 2/2016 | Wall | G06Q 30/0255 705/14.53 |
| 2016/0371724 | A1* | 12/2016 | Kulpa | G06Q 30/0246 |
| 2018/0183939 | A1* | 6/2018 | Wijetunge | H04M 15/58 |

OTHER PUBLICATIONS

Customer churn analysis: Churn determinants and mediation effects of partial defection in the Korean mobile telecommunications service industry JH Ahn, SP Han, YS Lee—Telecommunications policy, 2006—Elsevier (Year: 2006).*

Integration of machine learning techniques to evaluate dynamic customer segmentation analysis for mobile customers C Dullaghan, E Rozaki—arXiv preprint arXiv:1702.02215, 2017—arxiv.org (Year: 2017).*

Linking multi-category purchases to latent activities of shoppers: analysing market baskets by topic models H Hruschka—Marketing: ZFP—Journal of Research and Management, 2014—JSTOR (Year: 2014).*

* cited by examiner

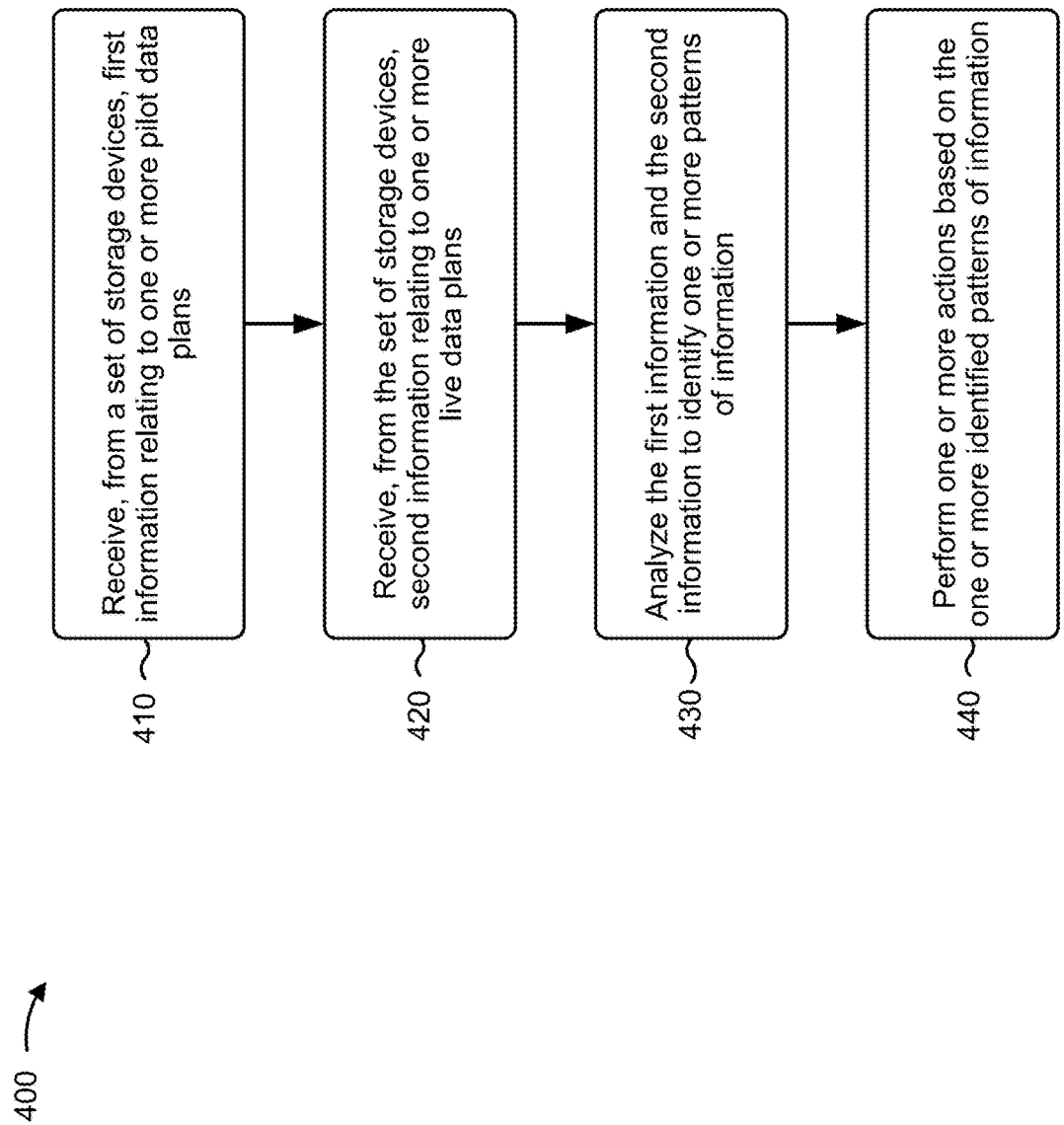

Data Usage Pilot Data Plan

Showing average data usage for 7 days

| Night Surfer | Social Plan | Unlimited Tier |
|---|---|---|
| * Social Media: 12MB<br>* Web & Apps: 6MB<br>* Audio 8MB<br>* Video: 15MB<br>* Downloads/Marketplace: 4MB<br>* Gaming: 10MB<br>* Maps & Navigation: 4MB<br>Email/ Messaging: 2MB<br>Communication Services: 1MB | * Social Media: 13MB<br>* Web & Apps: 4MB<br>* Audio 8MB<br>* Video: 14MB<br>* Downloads/Marketplace: 9MB<br>* Gaming: 11MB<br>* Maps & Navigation: 3MB<br>Email/ Messaging: 2MB<br>Communication Services: 2MB | * Social Media: 12MB<br>* Web & Apps: 8MB<br>* Audio 10MB<br>* Video: 15MB<br>* Downloads/Marketplace: 6MB<br>* Gaming: 13MB<br>* Maps & Navigation: 8MB<br>Email/ Messaging: 12MB<br>Communication Services: 10MB |

Select a category to view specific application data usage

FIG. 5C

Night Surfer Data Plan

| Total enrollment: 4,000 users | Gender | Age | Location | Income |
|---|---|---|---|---|
| Click here to see list of users | Male: 53% Female: 47% | 0-18: 20% 19-25: 30% 26-35: 26% 36+: 24% | United States Norte east: 27% South: 23% Midwest: 25% Northwest: 25%  Click here to have the breakdown by city/state | 0-50,000: 50% 50,000-100,000: 39% 100,000-200,000: 10% 200,000+: 1% |

FIG. 5D

Filters

Gender ⌄

Age ⌄

Location ⌄

Income ⌄

Time Range ⌄

☐ Show pre-pilot activity

☐ Show post-pilot activity

Showing data for 4,000 users

ANALYZING BIG DATA TO DETERMINE A DATA PLAN

BACKGROUND

Data service providers can offer data plans to users that include a variety of different data usage rates. Determining a data plan that is suitable for a particular user can be difficult because data service providers support billions of users that have a multitude of different preferences and data usage habits.

BRIEF DESCRIPTION OF THE DRAWINGS

FIG. 4 is a flow chart of an example process for performing an action based on patterns identified from data usage; and FIGS. 5A-5F are diagrams of example user interfaces associated with the example process described in FIG. 4.

DETAILED DESCRIPTION OF PREFERRED EMBODIMENTS

The following detailed description of example implementations refers to the accompanying drawings. The same reference numbers in different drawings can identify the same or similar elements.

A data service provider can offer data plans to users that include a variety of different data usage rates. For example, the data service provider can offer a data plan that provides unlimited data for a particular price, a data plan that provides a particular amount of data for a particular price, or the like. In some cases, a data plan can be underutilized by a user, such as when the user enrolls in a data plan and does not use data or uses a small amount of total data (e.g., an amount that is less than an amount provided by the data plan). In other cases, a data plan can be over utilized by a user, such as when the user enrolls in a data plan that provides a fixed amount of data, and the user exceeds the fixed amount. Furthermore, tracking data usage can be difficult when there are billions of user devices to track.

Implementations described herein provide for a data plan management platform to store and process data usage information, subscriber profile information, and/or survey information, and to use the processed data usage information and/or survey information to determine a recommended action to perform. In some implementations, the data plan management platform can perform in-memory computing tasks to process large quantities of data (e.g., terabytes) in short periods of time. In some cases, the data plan management platform can provide the processed data usage information to a manager of a data service provider, and the manager can access the processed data usage information via a user interface to view one or more performance metrics associated with a data plan. In other cases, the data plan management platform can use the processed data usage information to automatically modify a data plan, and the data plan management platform can automatically provide a recommendation to a user account to use the modified data plan.

By using data usage information, subscriber profile information, and/or survey information to determine a recommended action to perform, the data plan management platform conserves processing resources that might otherwise be used to support users adding and removing data plans. Furthermore, by analyzing large quantities of data usage information, subscriber profile information, and/or survey information, the data plan management platform improves user experience and user retention. Additionally, by performing in-memory computing, the data plan management platform conserves processing resources relative to a cloud infrastructure that processes data to and/or from disk.

Figure 1A:
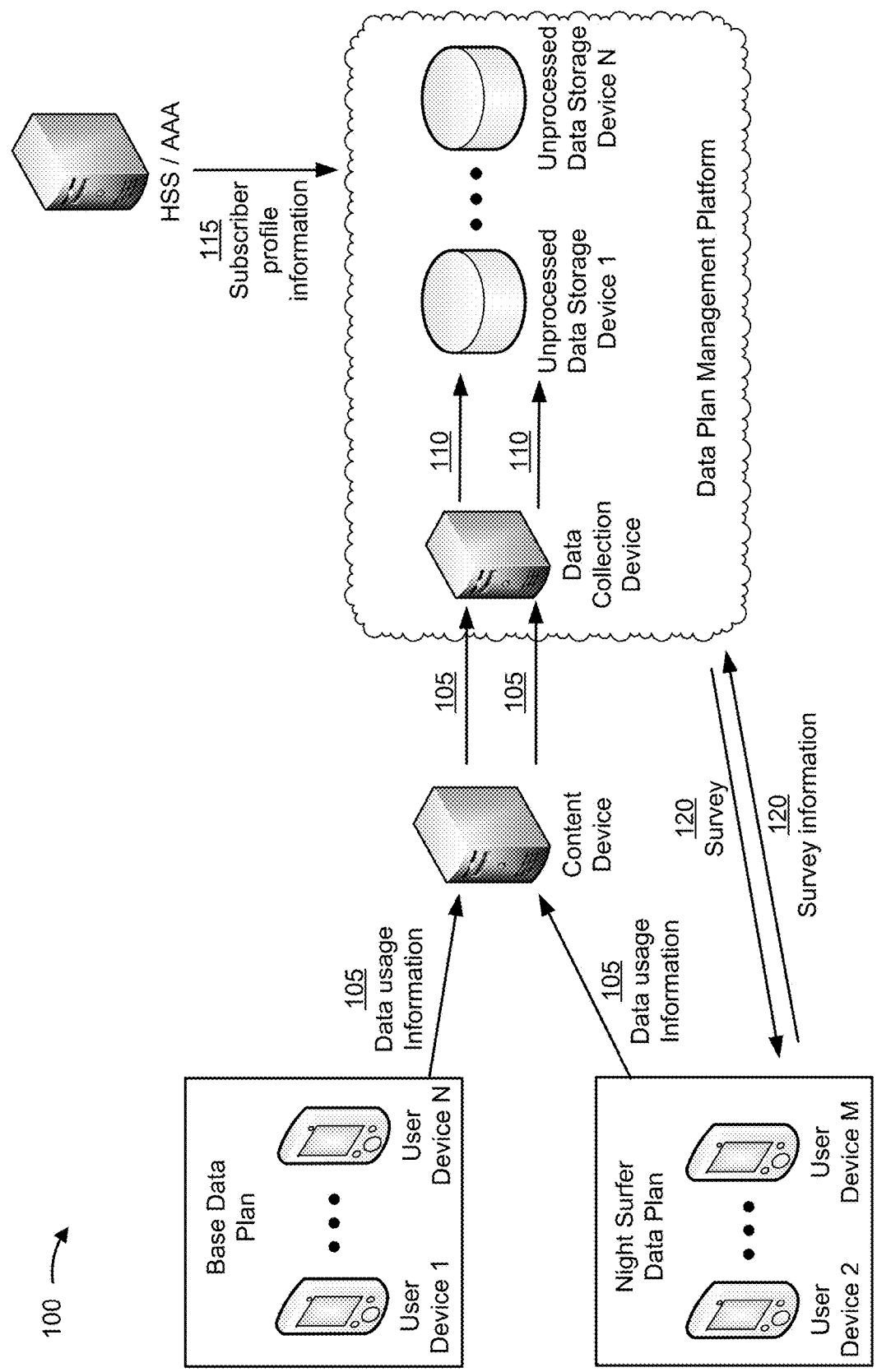
FIGS. 1A-1C are diagrams of an overview of an example implementation described herein.
Figure 1B:
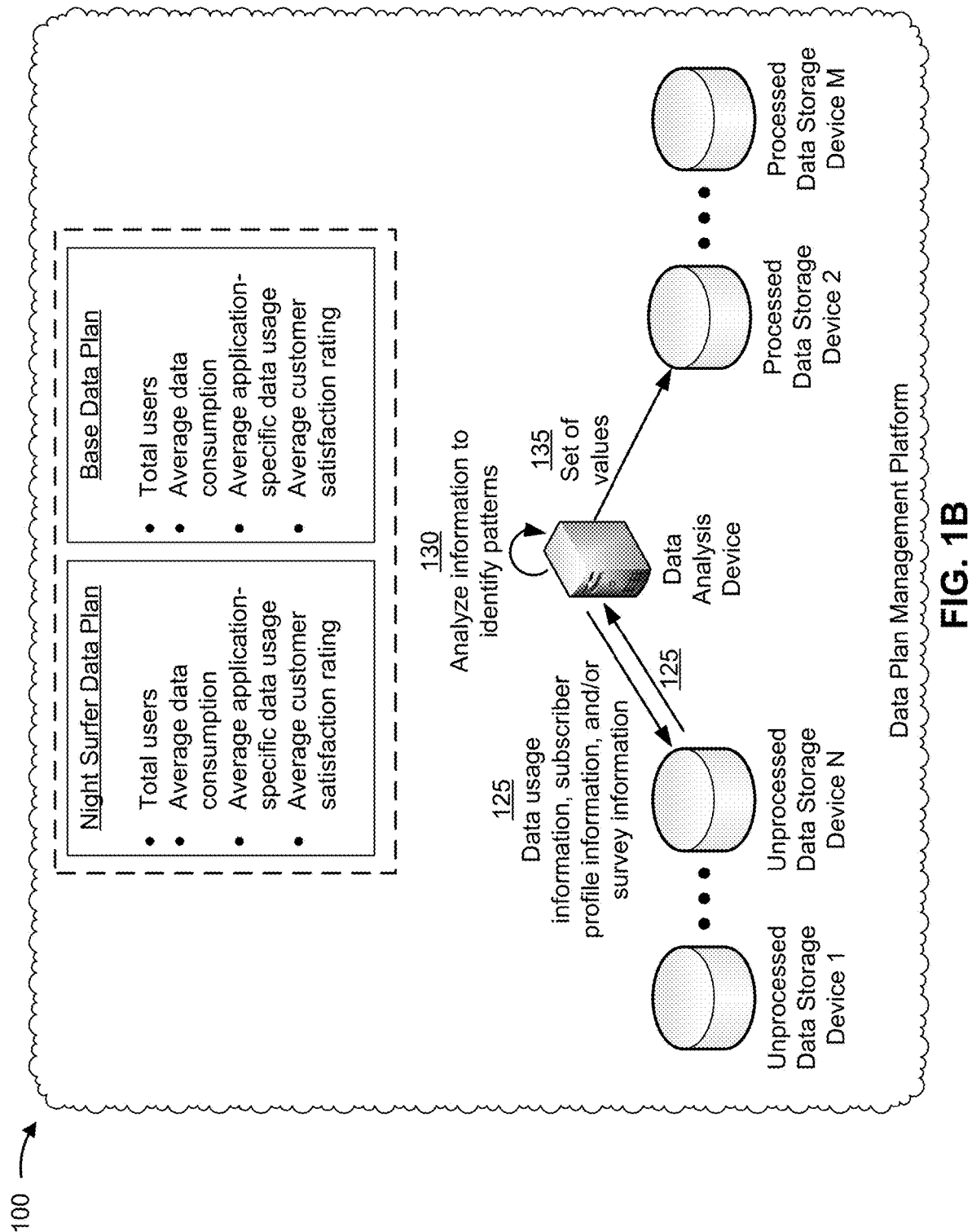
Figure 1C:
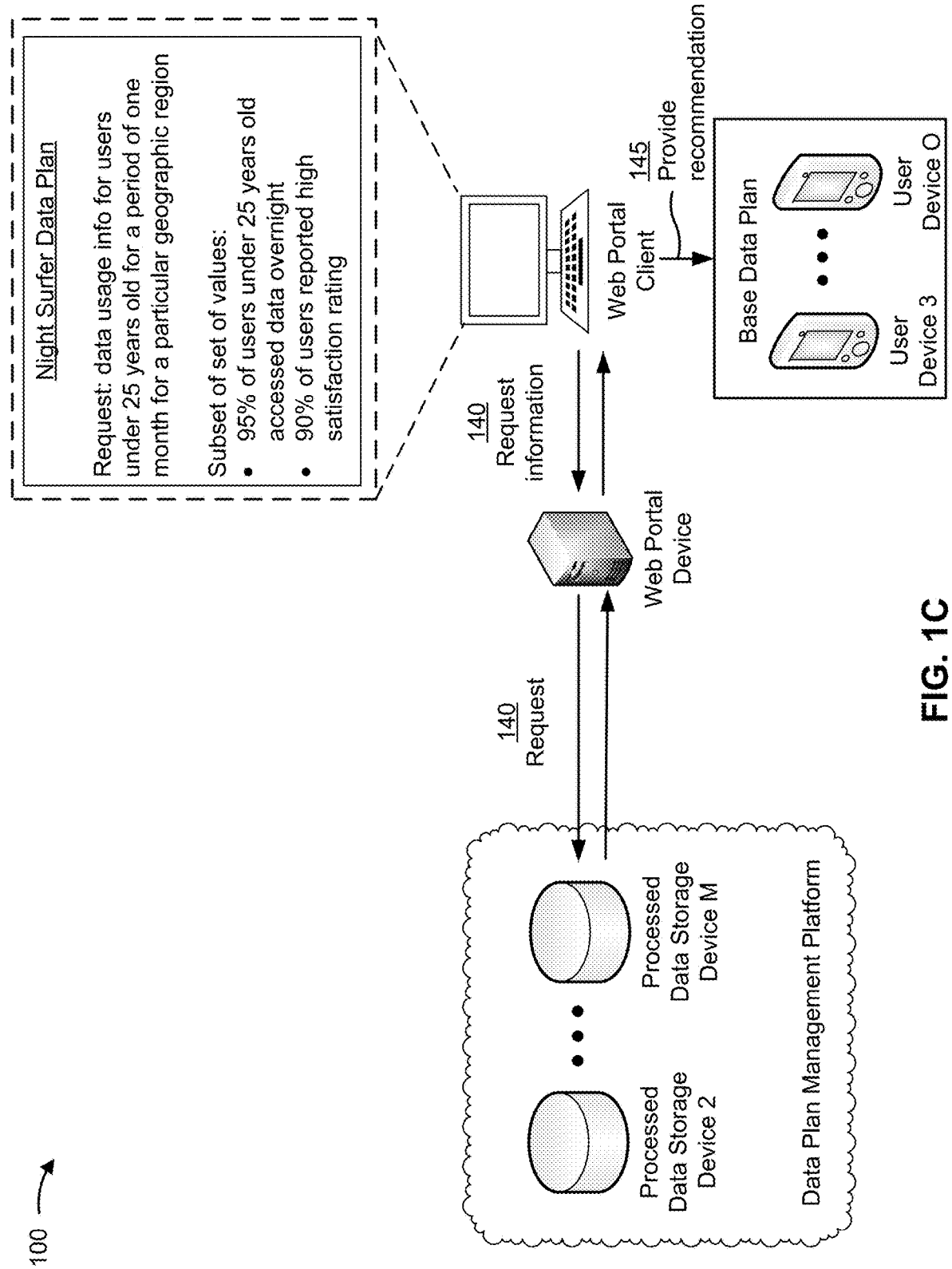

FIGS. 1A-1C are diagrams of an overview of an example implementation 100 described herein. As shown in FIGS. 1A-1C, example implementation 100 shows a data plan management platform for deploying a pilot data plan, and for analyzing data usage information associated with the pilot data plan to determine a recommended action to perform. For example, the data management platform can store and process data usage information for a base data plan and for a pilot data plan, such as a night surfer data plan (e.g., a data plan that offers discounted data services overnight, typically between 12:00 AM and 6:00 AM). The data plan management platform can analyze the data usage information associated with the base data plan and the night surfer data plan to determine a recommended action to perform for each user.

As shown in FIG. 1A, the base data plan can include a first group of user devices (shown as user device 1 through user device N) and the night surfer data plan can include a second group of user devices (shown as user device 2 through user device M). As shown by reference number 105, a content device can receive, from the first group of user devices, data usage information associated with the base data plan, and the content device can receive, from the second group of user devices, data usage information associated with the night surfer data plan. The data usage information can include a device identifier, data consumption information (e.g., a value indicating an amount of data being consumed, one or more values indicating application-specific data usage, etc.), location information (e.g., a value indicating a location at which a user device consumes data), time information (e.g., a value indicating a time and/or a date that the data is consumed), and/or the like. In this case, the content device can provide the data usage information to the data collection device.

As shown by reference number 110, the data collection device can provide the data usage information to the set of unprocessed data storage devices. For example, the data collection device can determine which unprocessed data storage devices to use to store the data usage information by executing a hash function. In some cases, the data collection device can provide the data usage information to unprocessed data storage devices using a load balancing technique.

As shown by reference number 115, the unprocessed data storage devices can be provisioned with subscriber profile information. For example, a home subscriber server/authentication, authorization, and accounting server (HSS/AAA) can provide, to the unprocessed data storage devices, subscriber profile information such as a device identifier, a user identifier, a data plan type identifier, user demographic information (e.g., a user age, a user ethnicity, a user income, etc.), fee information (e.g., an amount to charge for data usage), and/or the like.

As shown by reference number 120, the data plan management platform can provide the second set of user devices with an electronic survey. For example, the data plan management platform can provide an electronic survey that includes one or more questions to identify an effectiveness level of the pilot data plan (e.g., the night surfer data plan). The survey can include survey information, such as a user satisfaction rating (e.g., a rating system can assign one star to a negative rating and five stars to a positive rating), a user feedback review (e.g., a user can provide a summary of text describing positive and negative aspects of the pilot data plan), and/or the like In this way, data plan management platform (e.g., a data analysis device) can analyze the data usage information, the subscriber profile information, and the survey information to determine a recommended action to perform, as described further herein.

As shown in FIG. 1B, and by reference number 125, the data analysis device can obtain the data usage information, the subscriber profile information, and the survey information from a first set of data storage devices (e.g., a set of unprocessed data storage devices). For example, the data analysis device can be configured to obtain all (or some) of the data usage information, the subscriber profile information, and/or the survey information at particular time periods (e.g., every minute, every ten minutes, every hour, every day, etc.). In some cases, the data analysis device can obtain the data usage information, the subscriber profile information, and/or the survey information in response to a query that is initiated by a user via a command prompt.

As shown by reference number 130, the data analysis device can analyze information (e.g., the data usage information, the subscriber profile information, and/or the survey information) to identify one or more patterns. For example, the data analysis device can analyze the information to identify one or more patterns associated with the base data plan and the night surfer data plan. The one or more patterns can include patterns associated with data usage, patterns associated with revenue generation, patterns associated with user interest in a data plan, and/or the like. A pattern can be represented by a set of values that identify similarities between user devices enrolled in a data plan or between user devices enrolled in different data plans. As shown, patterns can be associated with performance metrics, and can be represented by a value indicating a total number of users associated with a particular data plan, a value indicating an average amount of data consumption, one or more values indicating average application-specific data usage, a value indicating an average user satisfaction rating, and/or the like. As shown by reference number 135, the data analysis device can provide the set of values indicating one or more patterns to a second set of data storage devices (e.g., a set of processed data storage devices).

By identifying one or more patterns and providing the set of values indicating the one or more patterns to the set of processed data storage devices, the data plan management platform is able to store the set of values in a manner that is accessible for further processing.

As shown in FIG. 1C, and by reference number 140, a web portal client can request information relating to the night surfer data plan and/or the base data plan. For example, a web portal client can request information associated with performance metrics that can be used to modify a data plan. In this case, an employee of a data service provider can access the web portal client to provide a request to a web portal device, and the web portal device can obtain the information associated with the performance metrics from the set of processed data storage devices. The information associated with the performance metrics can be displayed on a user interface of the web portal client.

As shown and by way of example, an employee of a data service provider can request data usage information for users, of the night surfer data plan, under 25 years old for a period of one month for a particular geographic region. In this case, results of the request can indicate that 95% of users under 25 years old have accessed data overnight, and that 90% of users reported a high level of satisfaction. The employee can use this information to provide a recommendation to user devices, associated with users under 25 years old who are enrolled in the base data plan, to enroll in the night surfer data plan.

As shown by reference number 145, the web portal client can provide a recommendation to a subset of the first set of user devices (shown as user device 3 through user device O). For example, the employee of the data service provider can provide, to a user device or to a user account, a recommendation to enroll in another data plan. As an example, assume 90% of users under the age of 25 that enroll in the night surfer data plan report a high satisfaction rating. In this case, the employee can access the user interface of the web portal client to provide a recommendation to users currently enrolled in the base data plan (e.g., users that are also under the age of 25) to enroll in the night surfer plan.

Additionally, or alternatively, the data analysis device can automatically modify a data plan. For example, the data analysis device can analyze the set of values indicating the one or more patterns to determine whether the set of values, or a subset of the set of values, satisfies a threshold (e.g., a data usage threshold), and can automatically modify a data plan based on the determination. Additionally, the data analysis device can automatically provide a recommendation to one or more user devices to use the modified data plan.

By analyzing data usage information, subscriber profile information, and/or survey information to determine a modified a data plan, the data plan management platform improves user satisfaction and user retention. This conserves processing resources and/or network resources that might otherwise be used to service user requests to change data plans.

As indicated above, FIGS. 1A-1C are provided merely as an example. Other examples are possible and can differ from what was described with regard to FIGS. 1A-1C.

Figure 2:
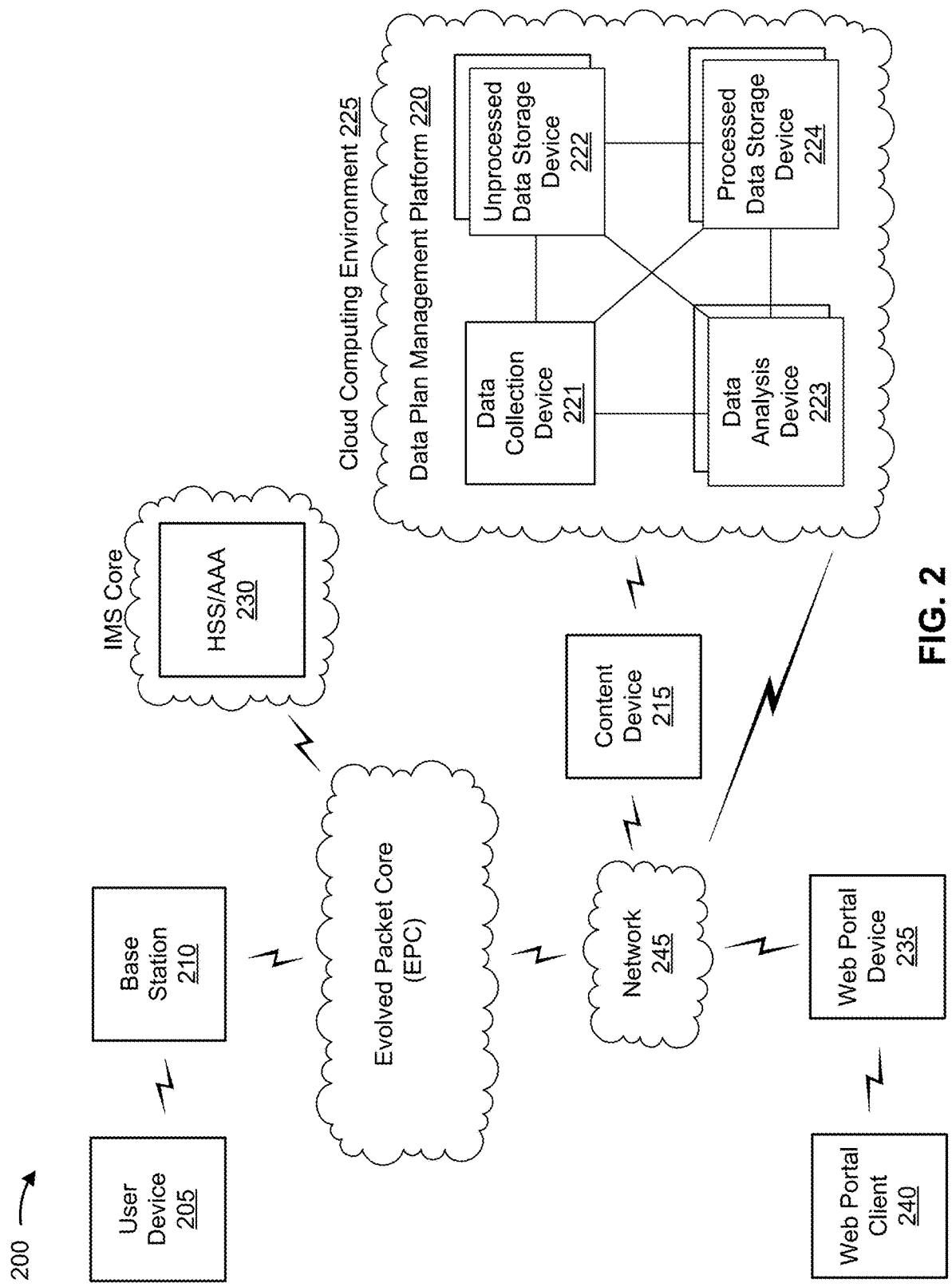
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include user device 205, base station 210, content device 215, data plan management platform 220 hosted within cloud computing environment 225, home subscriber server/authentication, authorization, and accounting server (HSS/AAA) 230, web portal device 235, web portal client 240, and/or network 245. Devices of environment 200 can interconnect via wired connections, wireless connections, or a combination of wired and wireless connections.

Some implementations are described herein as being performed within a long term evolution (LTE) network for explanatory purposes. Some implementations can be performed within a network that is not an LTE network, such as a fifth generation (5G) network.

User device 205 includes one or more devices capable of accessing a data service and/or receiving information associated with a data plan. For example, user device 205 can include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 205 can enroll in a data plan. Additionally, or alternatively, user device 205 can access a data service, and data usage associated with the data service can be sent to content device 215. Additionally, or alternatively, user device 205 can receive a recommendation to change a data plan, an indication that a data plan has been changed, or the like.

Base station 210 includes one or more devices capable of transferring traffic, such as audio, video, text, and/or other traffic, destined for and/or received from user device 205. In some implementations, base station 210 can include an evolved NodeB (eNB) associated with the LTE network that receives traffic from and/or sends traffic to network 245 via one or more network devices associated with the evolved packet core (EPC). Additionally, or alternatively, one or more base stations 210 can be associated with a RAN that is not associated with the LTE network. Base station 210 can send traffic to and/or receive traffic from user device 205 via an air interface. In some implementations, base station 210 can include a small cell base station, such as a base station of a microcell, a picocell, and/or a femtocell.

Content device 215 includes one or more devices capable of receiving, generating, storing, processing, and/or providing information associated with a data service. For example, content device 215 can include a computing device, such as a server device (e.g., a host server, a web server, an application server, etc.), a data center device, or a similar device. In some implementations, content device 215 can serve as an intermediary between user device 205 and data plan management platform 220, by providing data associated with user device 205 to data plan management platform 220.

Data plan management platform 220 includes one or more devices capable of receiving, storing, analyzing, modifying, generating, and/or providing information associated with data usage. In some implementations, data plan management platform 220 can be designed to be modular such that certain software components can be swapped in or out depending on a particular need. As such, data plan management platform 220 can be easily and/or quickly reconfigured for different uses. In some implementations, data plan management platform 220 receive, store, and process information associated with a set of data plans and/or data usage information in a particular way.

In some implementations, as shown, data plan management platform 220 can be hosted in cloud computing environment 225. Notably, while implementations described herein describe data plan management platform 220 as being hosted in cloud computing environment 225, in some implementations, data plan management platform 220 can be based outside of a cloud (i.e., can be implemented outside of a cloud computing environment) or can be partially cloud-based.

Cloud computing environment 225 includes an environment that hosts data plan management platform 220. Cloud computing environment 225 can provide computation, software, data access, storage, and/or other services that do not require end-user knowledge of a physical location and configuration of system(s) and/or device(s) that host data plan management platform 220. As shown, cloud computing environment 225 can include a group of devices, such as data collection device 221, unprocessed data storage device 222, data analysis device 223, and/or processed data storage device 224.

While implementations described herein can associate particular functionality with particular devices, any one of the devices associated with cloud computing environment 225 can perform any or all of the functionality described herein. Additionally, a single one of these devices can, in some implementations, be implemented by multiple devices. Further, a single one of these devices can be implemented on a single computing device or can be implemented on multiple computing devices.

Data collection device 221 includes one or more devices capable of receiving, storing, managing, and/or providing information associated with a data plan. For example, data collection device 221 can include a server or a group of servers. In some implementations, data collection device 221 can receive data usage information from content device 215. In some implementations, data collection device 221 can provide data usage information to unprocessed data storage device 222. In some cases, data collection device 221 can apply a hash function to determine which unprocessed data storage device 222 to send the data usage information.

Unprocessed data storage device 222 includes one or more devices capable of receiving, storing, processing, and/or providing data usage information. For example, unprocessed data storage device 222 can include multiple storage devices (e.g., a set of server racks in a data center). In some implementations, unprocessed data storage device 222 can communicate with other unprocessed data storage devices 222 included in data plan management platform 220. Additionally, or alternatively, unprocessed data storage device 222 can be a replicate of another unprocessed data storage device 222 to provide persistent data. Additionally, or alternatively, unprocessed data storage devices 222 can be located in multiple geographic locations, and can communicate via a network by executing application programming interface (API) calls. Additionally, or alternatively, unprocessed data storage device 222 can provide data usage information to data analysis device 223. Additionally, or alternatively, unprocessed data storage device 222 can store data usage information in random access memory (RAM), and can write data associated with a commit log to disk. In some implementations, unprocessed data storage device 222 can use a resilient distributed dataset (RDD) for data abstraction.

Additionally, unprocessed data storage device 222 can include one or more storage systems and/or one or more devices that use virtualization techniques within the storage systems or devices of unprocessed data storage device 222. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Data analysis device 223 includes one or more devices capable of obtaining, analyzing, determining, generating, and/or providing data usage information and/or information associated with a data plan. In some implementations, data analysis device 223 can provide distributed task dispatching, scheduling, input/output (I/O) functionalities, or the like, through an application programming interface (API) that uses the RDD abstraction. Additionally, or alternatively, data analysis device 223 can schedule tasks in parallel, thereby improving network efficiency. Additionally, or alternatively, data analysis device 223 can obtain data usage information from unprocessed data storage device 222. Additionally, or alternatively, data analysis device 223 can determine a set of values associated with the data usage information, and provide the set of values to processed data storage device 224. In some implementations, data analysis device 223 can generate information associated with a data plan, and can provide the information associated with the data plan to processed data storage device 224, to web portal client 240, to a user account, or the like. In some implementations, data analysis device 223 can be configured to automatically request and receive data usage information, subscriber profile information, and/or survey information (e.g., a request can be made per minute, per hour, per day, etc.).

Processed data storage device 224 includes one or more devices capable of receiving, storing, and/or providing data usage information and/or information associated with a data plan. In some implementations, processed data storage device 224 can include all (or some) of the functionalities and/or features of unprocessed data storage device 222. In some implementations, processed data storage device 224 can provide, to web portal device 235, a set of values associated with the data usage information and/or the information associated with the plan. In some implementations, processed data storage device 224 can store data usage information in RAM, and can write data associated with a commit log to disk.

HSS/AAA 230 can include one or more devices, such as one or more server devices, capable of managing (e.g., receiving, generating, storing, processing, and/or providing) information associated with user device 205. For example, HSS/AAA 230 can manage subscriber profile information associated with user device 205, such as information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of minutes allowed per time period, a quantity of data consumption allowed per time period, etc.), and/or similar information. HSS/AAA 230 can provide this information to one or more other devices of environment 200 to support the operations performed by those devices. For example, HSS/AAA 230 can provide the subscriber profile information to data plan management platform 220.

HSS/AAA 230 can include one or more devices, such as one or more server devices, that perform authentication, authorization, and/or accounting operations for communication sessions associated with user device 205. For example, HSS/AAA 230 can perform authentication operations for user device 205 and/or a user of user device 205 (e.g., using one or more credentials), can control access, by user device 205, to a service and/or an application (e.g., based on one or more restrictions, such as time-of-day restrictions, location restrictions, single or multiple access restrictions, read/write restrictions, etc.), can track resources consumed by user device 205 (e.g., a quantity of voice minutes consumed, a quantity of data consumed, etc.), and/or can perform similar operations.

Web portal device 235 includes one or more devices capable of receiving, processing, and/or providing a set of values associated with a data plan. For example, web portal device 235 can include a server or a group of servers. In some implementations, web portal device 235 can implement a platform that uses an event-driven non-blocking I/O model for supporting data-intensive applications. Additionally, or alternatively, web portal device 235 can receive a request from web portal client 240, and can communicate with processed data storage device 224 to obtain a set of values associated with the request.

Web portal client 240 includes one or more devices capable of requesting, receiving, and/or displaying a set of values associated with a data plan. For example, web portal client 240 can include a communication and/or computing device, such as a desktop computer, a laptop computer, a tablet computer, a handheld computer, a wearable communication device (e.g., a smart wristwatch, a pair of smart eyeglasses, etc.), or a similar type of device. In some implementations, a user interface of web portal client 240 can display the set of values associated with the data plan.

Network 245 includes one or more wired and/or wireless networks. For example, network 245 can include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
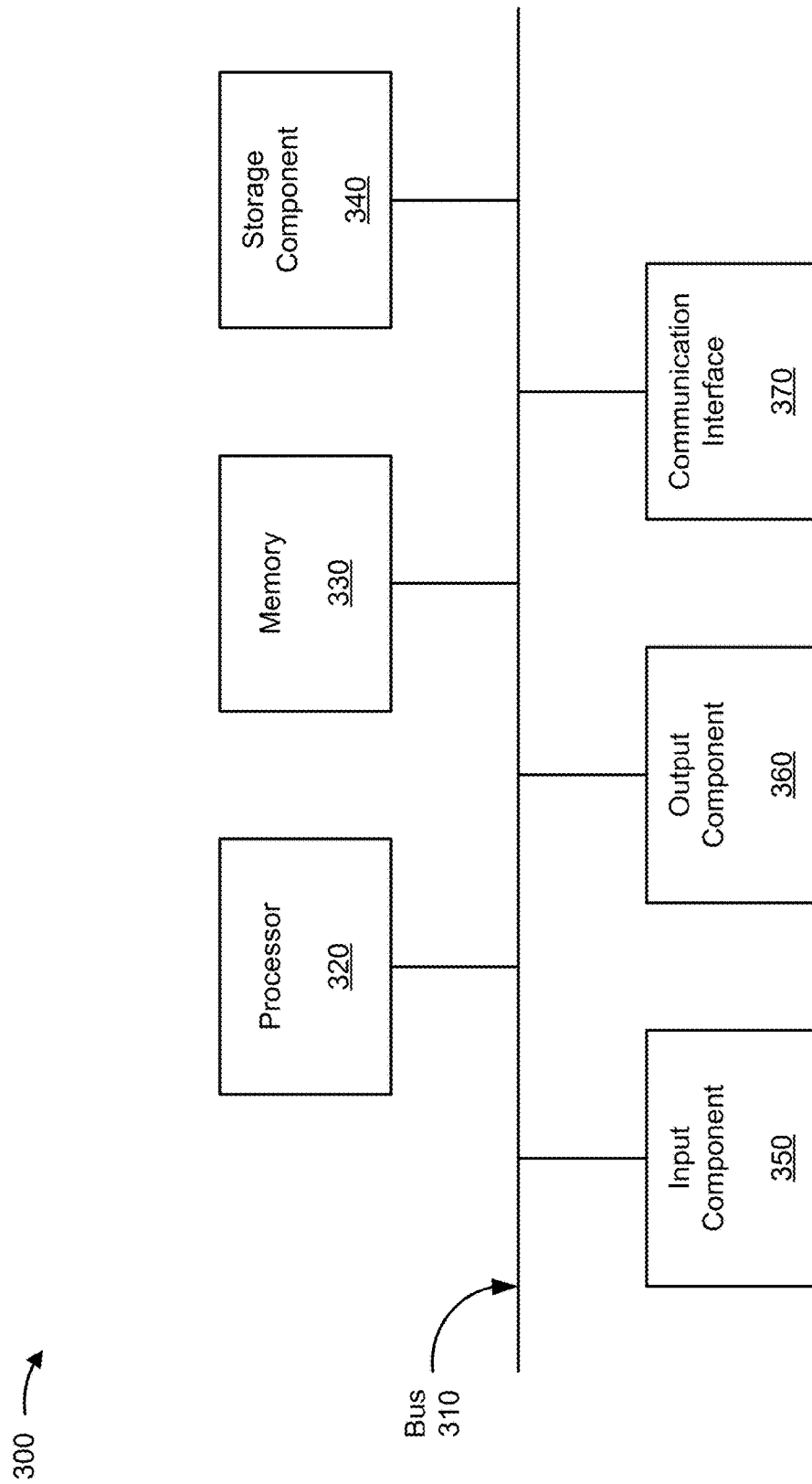
FIG. 3 is a diagram of example components of one or more devices of FIG. 2.

FIG. 3 is a diagram of example components of a device 300. Device 300 can correspond to user device 205, base station 210, content device 215, data plan management platform 220, HSS/AAA 230, web portal device 235, web portal client 240, and/or the like. In some implementations, user device 205, base station 210, content device 215, data plan management platform 220, HSS/AAA 230, web portal device 235, web portal client 240 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

FIG. 4 is a flow chart of an example process 400 for performing an action based on patterns identified from data usage. In some implementations, one or more process blocks of FIG. 4 can be performed by data analysis device 223. In some implementations, one or more process blocks of FIG. 4 can be performed by another device or a group of devices separate from or including data analysis device, such as user device 205, base station 210, content device 215, data collection device 221, unprocessed data storage device 222, processed data storage device 224, web portal device 235, web portal client 240, and/or the like.

As shown in FIG. 4, process 400 can include receiving, from a set of storage devices, first information relating to one or more pilot data plans (block 410). For example, data analysis device 223 can receive, from unprocessed data storage device 222, first information relating to one or more pilot data plans, such as data usage information, subscriber profile information, and/or survey information. A pilot data plan can be a data plan that is offered to a group of user devices 205 to gauge user interest in the pilot data plan (e.g., by tracking the data usage information, the subscriber profile information, and/or the survey information). In some implementations, data analysis device 223 can receive the first information for a group of user devices 205 that are accessing data services while enrolled in a pilot data plan.

In some implementations, data analysis device 223 can receive data usage information for a group of user devices 205 that are enrolled in a pilot data plan. For example, data analysis device 223 can receive data usage information that includes, for each user device 205 included in the group of user devices 205, a device identifier, data consumption information (e.g., to indicate an amount of data being consumed, to indicate an amount of data that a specific application is consuming, etc.), location information (e.g., a value indicating a location at which user device 205 consumes data), time information (e.g., a value indicating a time and/or a date that the data is consumed), and/or the like.

Additionally, or alternatively, data analysis device 223 can receive subscriber profile information for the group of user devices 205 that are enrolled in the pilot data plan. For example, data analysis device 223 can receive subscriber profile information that includes a device identifier, a user identifier, a data plan type identifier (e.g., to identify a particular data plan to which a user is enrolled), user demographic information (e.g., a user age, a user gender, a user ethnicity, a user location, a user income, etc.), fee information (e.g., an amount to charge for data usage), and/or the like. In some implementations, the subscriber profile information can be used to determine a number of user devices enrolling in and departing from a pilot data plan (e.g., by storing data plan type identifiers in a data structure). In some implementations, the subscriber profile information can be provided from HSS/AAA 230 to unprocessed data storage device 222, where the subscriber profile information can be accessed by data analysis device 223. In some implementations, the subscriber profile information can be stored by unprocessed data storage device 222 in a manner that allows the subscriber profile information for a particular user device 205 to be accessed in conjunction with the data usage information and/or the survey information associated with the particular user device 205.

Additionally, or alternatively, data analysis device 223 can receive survey information for the group of user devices 205 that are enrolled in the pilot data plan. For example, data analysis device 223 can receive survey information that includes a user satisfaction rating (e.g., a rating system can assign one star to a negative rating and five stars to a positive rating), a user feedback review (e.g., a user can provide a summary of text describing positive and negative aspects of the pilot data plan), and/or the like. In some implementations, the survey information can be used to determine a number of user devices enrolling in and departing from a pilot data plan. In some implementations, the survey information can be stored by unprocessed data storage device 222 in a manner that allows the survey information for a particular user device 205 to be accessed in conjunction with the data usage information and/or the subscriber profile information associated with the particular user device 205.

By receiving the first information relating to the one or more pilot data plans, data analysis device 223 is able to analyze the first information to identify one or more patterns of information that can be used to determine a recommended action to perform, as described further herein.

As further shown in FIG. 4, process 400 can include receiving, from the set of data storage devices, second information relating to one or more live data plans (block 420). For example, data analysis device 223 can receive, from unprocessed data storage device 222, second information relating to one or more live data plans, such as data usage information and/or subscriber profile information. A live data plan can be a data plan that a data service provider has deployed and that is publicly available to users. In some implementations, data analysis device 223 can receive data usage information and/or subscriber profile information for a group of user devices 205 that are accessing data services while enrolled in a live data plan.

In this way, data analysis device 223 is able to analyze the second information (e.g., with the first information, without the first information, etc.) to identify one or more patterns of information that can be used to determine a recommended action to perform, as described further herein.

As further shown in FIG. 4, process 400 can include analyzing the first information and the second information to identify one or more patterns of information (block 430). For example, data analysis device 223 can analyze the first information and the second information to identify one or more patterns of information, such as patterns associated with data usage (e.g., a pattern relating to average data usage or total data usage, a pattern relating to data usage for a particular demographic of users, etc.), patterns associated with revenue generation, patterns associated with user interest in a data plan, and/or the like. A pattern can be represented by a set of values that identify similarities between user devices 205 included in a data plan or between user devices 205 included in different data plans. A value in the set of values can identify a particular metric, such as a total, an average, and/or the like. In some implementations, data analysis device 223 can identify a pattern by analyzing the first information and the second information, and can modify a data plan and/or generate a new data plan after determining whether the analyzed information satisfies a threshold. Additionally, or alternatively, data analysis device 223 can use the one or more patterns to generate a data model, and the data model can be used to determine a recommended action to perform, as described further herein.

In some implementations, data analysis device 223 can identify one or more patterns associated with data usage. For example, data analysis device 223 can analyze the first information and/or the second information to identify data usage patterns between groups of user devices 205. In some cases, data usage patterns can be identified by a set of values, such as a value indicating total data usage or average data usage (e.g., from one or more user devices 205 accessing data services as part of a data plan), one or more values indicating application-specific data usage (e.g., from one or more user devices 205 accessing application-specific data services as part of a data plan), one or more values indicating category-specific data usage (e.g., from one or more user devices 205 accessing data services for a particular category of application as part of a data plan), and/or the like. In this way, data analysis device 223 is able to identify data usage patterns that can be used to determine a recommended action to perform.

Additionally, or alternatively, data analysis device 223 can identify one or more patterns associated with data usage for particular demographics of users (i.e., a demographic information pattern). For example, data analysis device 223 can analyze the first information and/or the second information to identify data usage patterns for one or more demographics of users that are enrolled in the data plans. In some cases, data usage patterns for a particular user demographic can be identified by a set of values, such as a value indicating an amount of data usage associated with a group of user devices 205 that share an age or that are within a particular age range, a value indicating an amount of data usage associated with a group of user devices 205 that share the same gender, a value indicating an amount of data usage associated with a group of user devices 205 that share a location, a value indicating an amount of data usage associated with a group of user devices 205 that have an income within a particular income range, and/or the like. Additionally, or alternatively, data analysis device 223 can analyze demographic information and survey information relating to user interests. For example, data analysis device 223 can identify a pattern indicating that a particular demographic of users has a higher user satisfaction rating, with respect, for example, to a pilot data plan, than user satisfaction ratings associated with other demographics of users.

Additionally, or alternatively, data analysis device 223 can identify one or more patterns associated with revenue generation. For example, data analysis device 223 can analyze fee information included in the first information and/or the second information to identify revenue generation patterns between groups of user devices 205. In some cases, revenue generation patterns can be identified by a set of values, such as a value indicating an amount of revenue generated for the data plan over a time period, a value indicating an amount of revenue generated for a particular user device 205 over a time period, and/or the like.

Additionally, or alternatively, data analysis device 223 can identify one or more patterns associated with user interests. For example, data analysis device 223 can analyze information associated with user interests to identify a user interest pattern between groups of user devices 205. In some cases, a pattern associated with user interests can be identified by a set of values included in and/or determined from the subscriber profile information and/or the survey information. For example, the survey information for user device 205 can include a value indicating a user satisfaction rating, and data analysis device 223 can use the user satisfaction rating values for all user devices 205 enrolled in a data plan to determine the average user satisfaction rating and/or the total user satisfaction rating. Additionally, the subscriber profile information can include a data plan type identifier, which can be used to determine a value indicating a total number of users enrolled in a data plan, a value indicating a number of users enrolling in a data plan over a time period, a value indicating a number of users departing from a data plan over a time period, and/or the like.

In some implementations, data analysis device 223 can identify a pattern by analyzing the first information and/or the second information, and determining whether the first information and/or second information satisfies a threshold. For example, data analysis device 223 can analyze the first information and/or the second information by comparing data usage information and/or demographic information for user devices 205 that are accessing data services as part of a data plan. In this case, data analysis device 223 can determine whether the first information and/or the second information satisfies a threshold. In some cases, the threshold can be a data usage threshold (e.g., a threshold amount of data usage, a threshold amount of application-specific data usage, etc.), a threshold number of users, a threshold rate of change in a number of users over a particular time period, a threshold associated with a user satisfaction rating for a particular demographic of users, or the like.

In some implementations, data analysis device 223 can analyze information (e.g., the first information and/or the second information) by sorting the information by a set of categories. For example, data analysis device 223 can analyze data usage information by sorting data usage information into categories based on ranges of data usage (e.g., 0-1 megabytes (MB), 1-2 MB, 2-5 MB, 5+ MB, etc.). Additionally, or alternatively, data analysis device 223 can analyze subscriber profile information and/or survey information in a similar manner. In some cases, data analysis device 223 can determine whether one or more categories of the set of categories satisfies threshold level of similarity. In this case, data analysis device 223 can identify a set of values indicating a pattern based on determining that the one or more categories satisfies the threshold level of similarity. In this way, data analysis device 223 is able to segment information into categories to determine patterns that can be used to modify a data plan and/or generate a new data plan.

In some implementations, data analysis device 223 can identify one or more patterns that can be used to generate a data model. For example, data analysis device 223 can generate the data model based on the one or more patterns determined from the first information and/or the second information. In some implementations, the data model can be a general linear model or another type of model. In some implementations, data analysis device 223 can input a set of data values relating to a particular user into the data model to determine an alternative data plan for the particular user. In some implementations, data analysis device 223 can input information relating to a particular data plan into the data model to identify users who would likely be interested in the particular data plan. In some implementations, data analysis device 223 can use the data model to identify a new data plan that is to be used as a pilot data plan. For example, data analysis device 223 can determine, based on the data model, that data usage is above a particular threshold for a particular category of applications, such as a gaming category. Data analysis device 223 can create a new pilot data plan (e.g., a gaming data plan) in which data usage, for select gaming applications, does not count against a user's data plan usage limit.

In this way, data analysis device 223 can determine one or more patterns of information, and can use the one or more patterns of information to determine a recommended action to perform.

As further shown in FIG. 4, process 400 can include performing one or more actions based on the one or more identified patterns of information (block 440). For example, data analysis device 223 can perform one or more actions to modify a data plan (e.g., a pilot data plan, a live data plan, etc.) and/or to generate a new pilot data plan. In some implementations, data analysis device 223 can modify a data plan, identify a group of user accounts as candidates for the modified data plan (e.g., the modified pilot data plan, the modified live data plan, etc.), and transmit, to a group of user devices 205 associated with the group of user accounts, information relating to the modified data plan. Additionally, or alternatively, data analysis device 223 can generate a new pilot data plan, identify a group of user accounts as candidates for the new pilot data plan, and transmit, to a group of user devices 205 associated with the group of user accounts, information relating to the new pilot data plan.

In some implementations, prior to modifying a data plan and/or generating a new data plan, data analysis device 223 can provide one or more sets of values that identify the one or more patterns to processed data storage devices 224. For example, the one or more sets of values can be stored by processed data storage devices 224 to allow data analysis device 223 and/or a device outside of data plan management platform 220 (e.g., web portal device 235, web portal client 240, etc.) to request one or more values. In some implementations, the request for one or more values can include a request for one or more patterns associated with data usage, user demographics, user interests, and/or the like.

Additionally, an employee of a data service provider can request one or more values and can use the one or more values to identify an action to perform. For example, an employee can use web portal client 240 to request one or more values associated with a particular demographic of users, and the employee can receive the one or more values for display on a user interface of web portal client 240. Searching by demographic information can allow the employee to search by age, gender, income, location, or the like. Example user interfaces that can be provided to the user are shown in FIGS. 5A-5F.

In some implementations, data analysis device 223 can modify a data plan. For example, data analysis device 223 can modify a data plan by modifying one or more data plan parameters (e.g., pilot data plan parameters, live data plan parameters, etc.) associated with the data plan. The data plan parameters can include a plan type parameter, a data limit parameter (e.g., an overall data usage parameter, an application-specific data usage parameter to identify any application-specific data consumption rules, etc.), a time parameter (e.g., an amount of free data or discounted data that can be accessible during a particular time period), a revenue parameter (e.g., a fee to charge for data usage), and/or the like.

Additionally, or alternatively, data analysis device 223 can identify one or more user accounts as candidates for a data plan (e.g., for the modified data plan). For example, data analysis device 223 can identify one or more user accounts as candidates for the modified data plan based on identifying the one or more patterns. In some cases, data analysis device 223 can identify user accounts where data usage exceeds a threshold (e.g., for a particular application, for a particular application category, etc.). In some cases, data analysis device 223 can identify user accounts where the user accounts share a threshold amount of demographic information.

Additionally, or alternatively, data analysis device 223 can transmit, via a network, a recommendation to one or more user devices 205 to enroll in a data plan (e.g., in the modified data plan). For example, data analysis device 223 can generate the modified data plan, select user accounts as candidates for the modified data plan, and can provide a recommendation to one or more user devices 205 that are associated with the one or more user accounts to enroll in a data plan. In some cases, data analysis device 223 can provide a notification to the one or more user devices 205 that a data plan is being modified. In this way, data analysis device 223 is able to notify a user of a data plan that may be more preferential to the user.

Additionally, or alternatively, data analysis device 223 can generate a new data plan. For example, data analysis device 223 can generate a new data plan that includes one or more data plan parameters, identify a group of user accounts as candidates for the new data plan, and transmit information relating to the new data plan to a group of user devices 205 associated with the group of user accounts, in the same manner described above.

Additionally, or alternatively, data analysis device 223 can schedule a sales representative to call users to enroll in a data plan. For example, data analysis device 223 can generate a work order, select a sales representative (e.g., by selecting an identifier associated with a particular sales representative), transmit the work order to a device associated with the sales representative, and generate a calendar entry associated with the work order. For example, data analysis device 223 can generate a work order that includes contact information for a user account, information identifying a recommended data plan, one or more patterns of information that can be used by the sales representative when recommending the data plan (e.g., why this particular data plan might be attractive to a particular user), and/or the like. In this case, data analysis device 223 can analyze one or more sales representative calendars and/or one or more sales representative qualifications (e.g., a sales representative might specialize in a particular pilot data plan), and can select the sales representative that has a calendar opening and/or that satisfies the one or more qualifications. Additionally, data analysis device 223 can transmit the work order to a device associated with the selected sales representative, and can generate a calendar entry associated with the work order. Additionally, or alternatively, data analysis device 223 can automatically contact a user to initiate a sales call. Additionally, or alternatively, data analysis device 223 can automatically describe a recommended data plan to a user via an automated message. In this way, data analysis device 223 is able to schedule an appointment with a sales representative to recommend a data plan.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

By using the first information and/or the second information to determine a recommended action to perform, the data plan management platform conserves processing resources that might otherwise be used to support users adding and removing data plans. Additionally, by storing and processing large quantities of data to determine a data plan, data analysis device 223 conserves network resources that might otherwise be allocated to switching users to and from various data plans. Furthermore, by performing in-memory computing, data analysis device 223 conserves processing resources relative a cloud infrastructure that processes data to and/or from disk.

FIGS. 5A-5F are diagrams of example user interfaces associated with the example process described in FIG. 4. As shown in FIGS. 5A-5F, a user interface of web portal client 240 can display a set of values indicating one or more performance metrics associated with one or more pilot data plans.

Figure 5A:
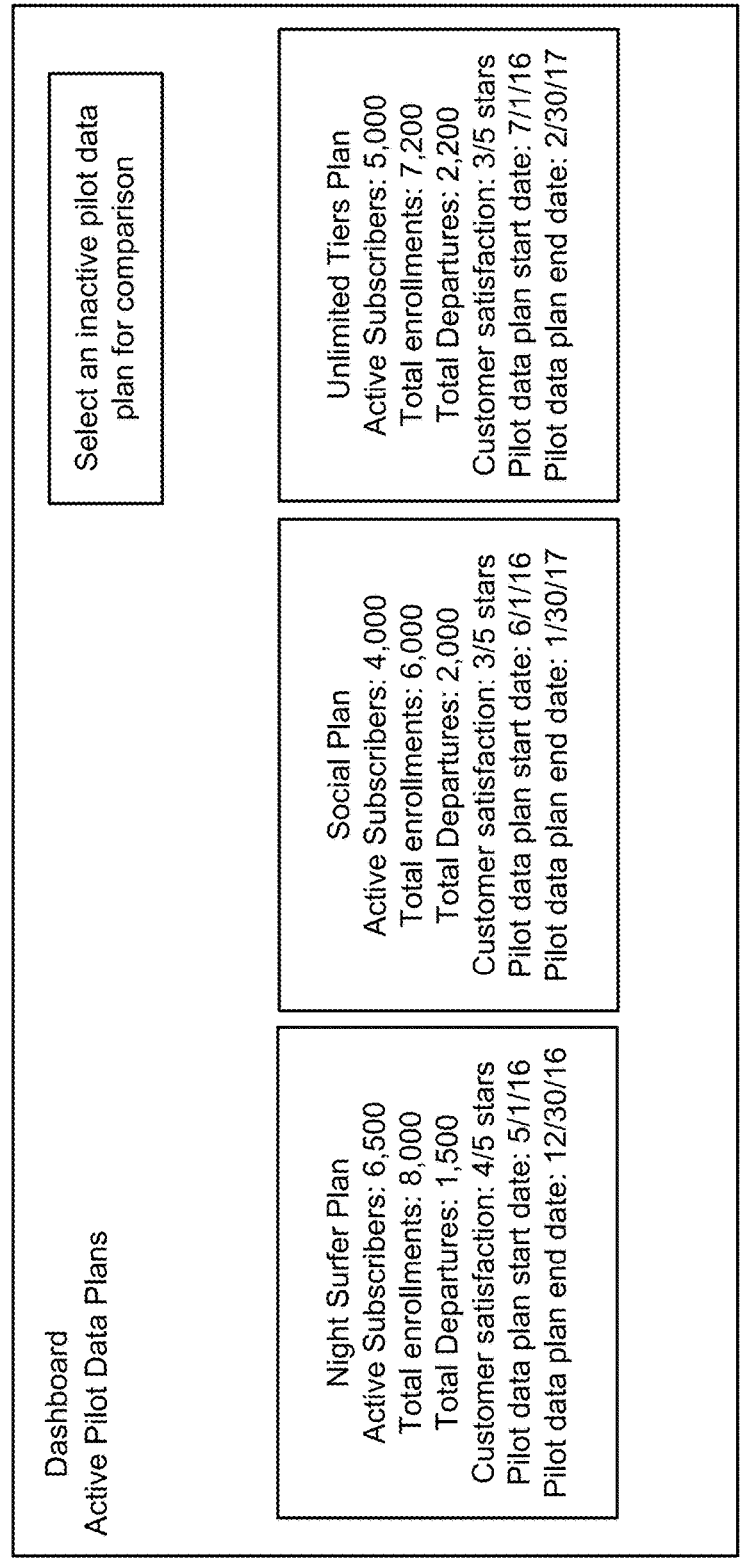

As shown in FIG. 5A, assume that three pilot data plans are being tested—a night surfer data plan, a social data plan, and an unlimited tier plan. In this example, the user interface can display, for each data plan, a total number of active subscribers, a total number of enrollments in the pilot data plan, a total number of departures from the pilot data plan, a number of days that the pilot data plan has been active, an average user satisfaction rating, and/or the like. This user interface provides an overview of how each of the pilot data plans are performing.

Figure 5B:
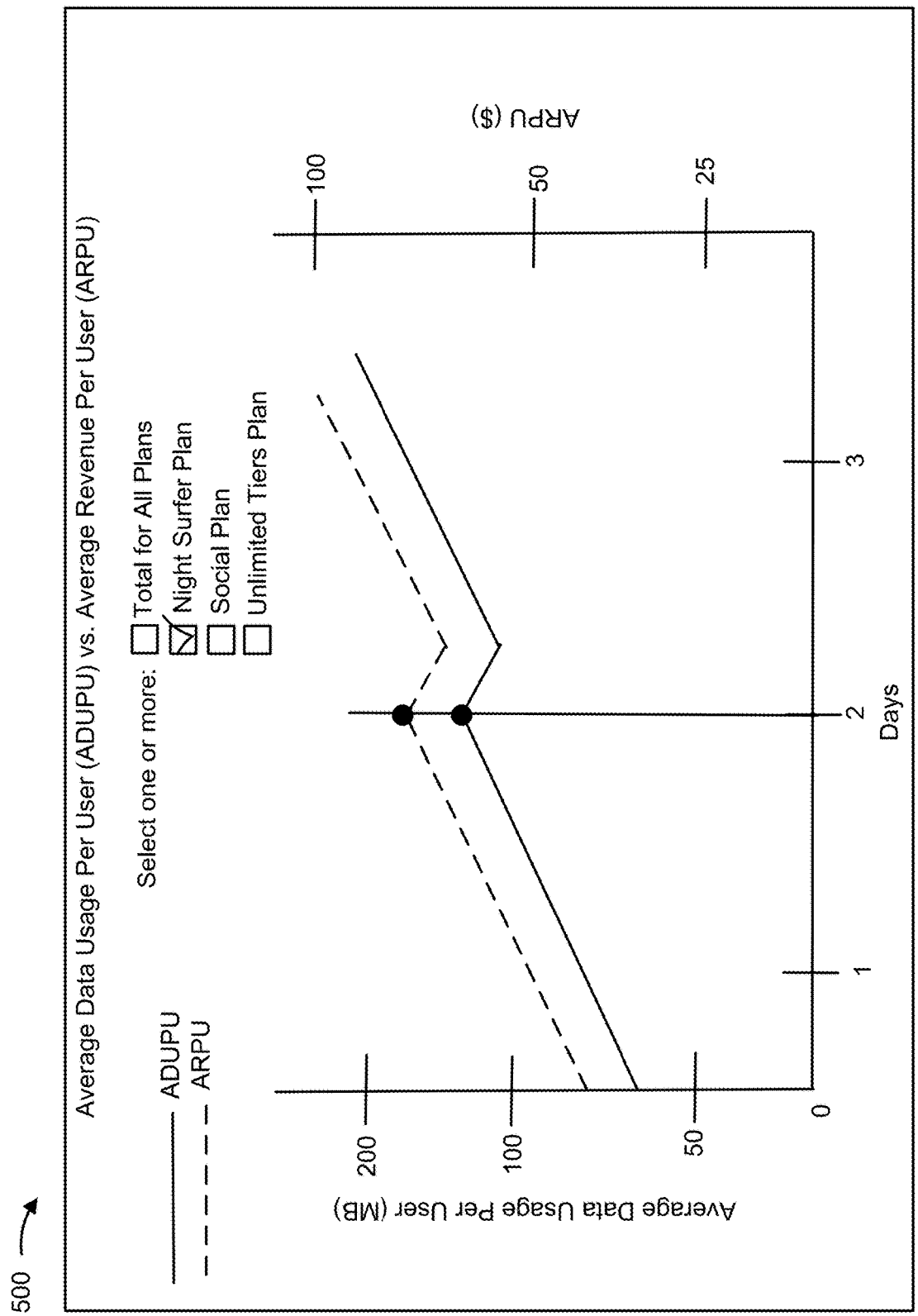

As shown in FIG. 5B, the user interface can display, on a per pilot data plan basis and/or overall, the average data usage per user (ADUPU) and the average revenue per user (ARPU) for each day of the pilot data plans. As shown as an example, the ADUPU for the night surfer data plan on day 2 of that pilot data plan is 107 megabytes (MB) and the ARPU is $74. As is shown, a user can select to view totals for all data plans, which can allow the user to visualize which plan has the highest average data usage and/or the highest average revenue per user from among the three pilot data plans.

As shown in FIG. 5C, the user interface can display application-specific data usage for pilot data plans. Shown as an example, a user interface can display application-specific data usage for a seven day period. In some cases, the user interface can display data usage by application category. For example, a user interface is shown to display data usage associated with a social media category, a web and applications category, an audio category, a video category, a downloads and marketplace category, a gaming category, a maps and navigation category, an e-mail and messaging category, and a communication services category. Additionally, a user can select an application category, and can view application-specific data usage associated with the application category. For example, clicking on the social media category can display one or more social media applications that a user (e.g., a user enrolled in the data plan) accessed during the seven day period, and can also display application-specific data usage associated with the one or more social media applications.

As shown in FIG. 5D, the user interface can display user demographic information for users enrolled in a pilot data plan (e.g., a night surfer data plan), such as gender, age, location, income, and/or the like. Shown as an example, the user interface can display demographic information for a night surfer data plan. In this example, the user interface can display a total enrollment of users (e.g., 4,000 users). Additionally, the user interface can display information associated with gender, such a gender distribution between the total number of enrolled users (e.g., 53% male, 47% female). Additionally, the user interface can display information associated with age, such as a percentage of users between particular age ranges (e.g., shown as 20% of users between ages 0-18, 30% of users between ages 19-25, 26% of users between ages 26-35, and 24% of users over the age of 35). Additionally, the user interface can display information associated with location, such as a percentage of users located in particular regions in the United States (e.g., 27% of users in the Northeast region, 23% of users in the Southern region, 25% of users in the Midwest region, and 25% of users in the Northwest region). In this case, a user can click on a particular geographic region to view a distribution of location information by county, city, state, and/or the like. Additionally, the user interface can display information associated with income, such as a percentage of users that have an income within a particular income range (e.g., 50% of users have an income between $0.00 and $50,000, 39% of users have an income between $50,000 and $100,000, 10% of users have an income between $100,000 and $200,000, and 1% of users have an income over $200,000).

As shown in FIG. 5E, the user interface can display one or more filters that can be used to sort data usage information, subscriber profile information, and/or survey information. For example, the one more filters can filter information based on a gender, an age, a location, an income, a time range, or the like. In some cases, the one or more filters can include a setting that allows a user to search for all information of a particular type (e.g., a search can select for all genders, all ages, all locations, all incomes, etc.). In some implementations, the user interface can track users that enroll in a pilot data plan before and after a pilot data plan enrollment period. This can allow data analysis device 223 to compare user habits before, during, and after a pilot data plan is tested.

Figure 5F:
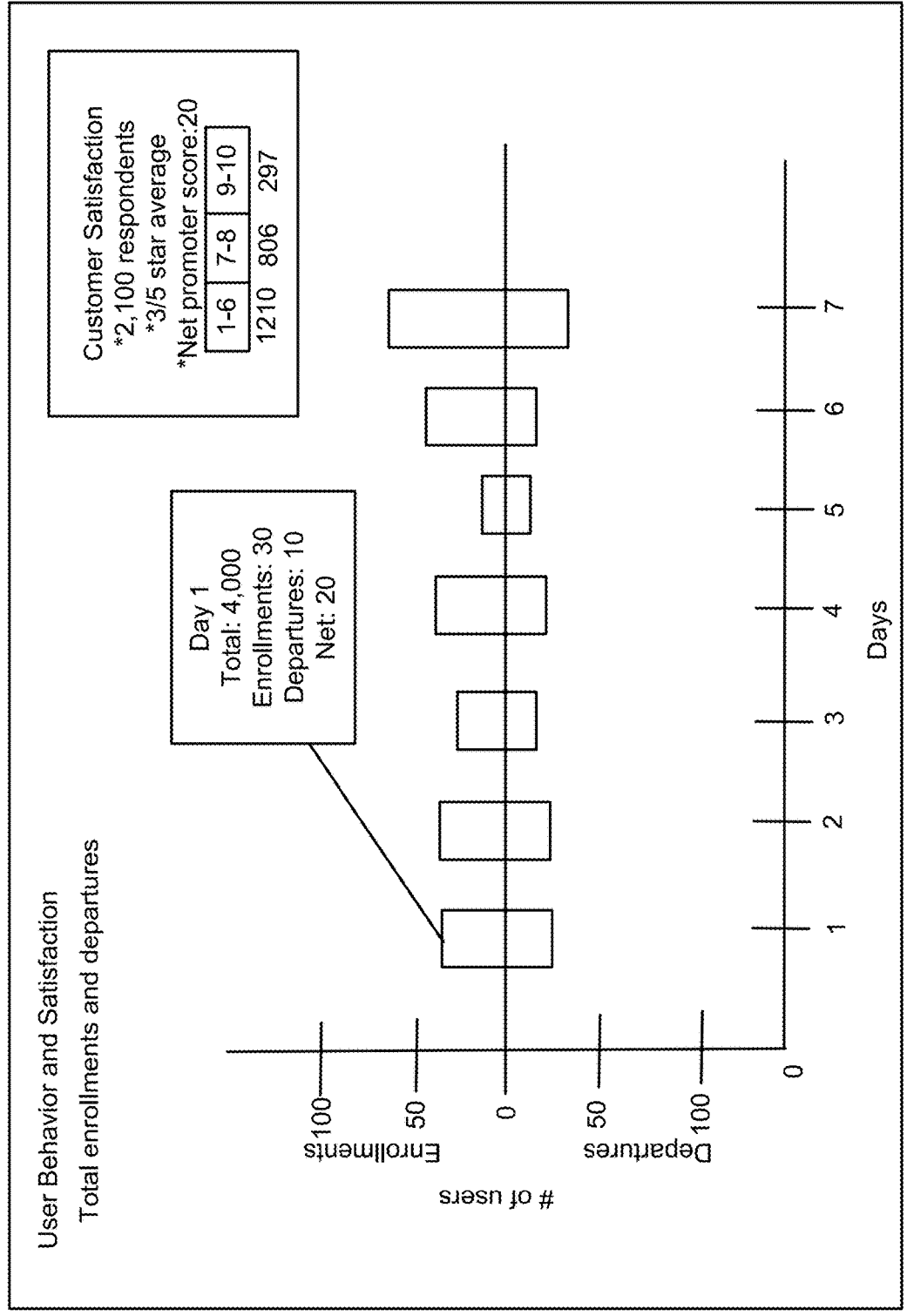

As shown in FIG. 5F, the user interface can display a visualization of one or more trends associated with data usage information, subscriber profile information, and/or survey information. Shown as an example, the user interface can display a visualization of a number of users enrolling and departing from a pilot data plan over a period of seven days. Additionally, the user interface can display a customer satisfaction rating (e.g., 3 stars out of 5 stars) and a net promoter score. In some cases, the filters described in FIG. 5E can be applied to generate the visualization.

By determining a set of values that identify patterns, and displaying the set of values on a user interface, data plan management platform 220 is able to visualize big data to determine an action to perform.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface can include a graphical user interface, a non-graphical user interface, a text-based user interface, etc. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An analysis device, comprising:
one or more memories; and
one or more processors, communicatively coupled to the one or more memories, to:
receive, from at least one unprocessed data storage device included in a data plan management platform associated with the analysis device, first information relating to a pilot data plan,
where the at least one unprocessed data storage device received the first information from at least two of:
a home subscriber server/authentication, authorization, and accounting server (HSS/AAA),
at least one content device that collects at least a portion of the first information as an intermediary between the data plan management platform and user devices, or
a data collection device included in the data plan management platform,
the pilot data plan being associated with a first group of user devices, the pilot data plan being a plan for which at least one of data usage information, subscriber profile information, or survey information, is tracked for devices enrolled in the pilot data plan, and
the first information including:
first data usage information specifying network data consumption for the first group of user devices,
the first data usage information specifying first data usage attributable to an application category, of a plurality of application categories, associated with one or more first applications used by the first group of user devices;
receive, from the at least one unprocessed data storage device, second information relating to a live data plan,
where the unprocessed data storage device received the second information from at least two of:
the HSS/AAA,
the at least one content device, or
the data collection device,
the live data plan being associated with a second group of user devices, and
the second information including second data usage information specifying network data consumption for the second group of user devices,
the second data usage information specifying second data usage attributable to the application category, of the plurality of application categories, associated with one or more second applications used by the second group of user devices;
analyze, using in-memory computing and the one or more memories, the first information and the second information to generate processed data identifying one or more patterns of information,
the one or more patterns including:
a data usage pattern identifying similarities between the first data usage attributable to the application category and the second data usage attributable to the application category, and
a user interest pattern indicating differences in measures of user interest with respect to the pilot data plan and the live data plan;
store the processed data in at least one processed data storage device included in the data plan management platform associated with the analysis device;
generate, using the one or more patterns, a data model;
receive, via a web portal device in communication with the data plan management platform, a request associated with the processed data;
determine, using the data model, based on the request, and using in-memory computing and the one or more memories, actions to perform associated with at least one of the pilot data plan or the live data plan; and
perform the actions,
the actions including:
modifying the pilot data plan or the live data plan,
identifying one or more user accounts as candidates for the modified pilot data plan or the modified live data plan, and
transmitting, via the web portal device, and to at least one user device in the first group of user devices or the second group of user devices, information relating to the modified pilot data plan or the modified live data plan.

2. The analysis device of claim 1, where the first information and the second information include at least one of:
the subscriber profile information, or
the survey information.

3. The analysis device of claim 1, where the one or more processors, when analyzing the first information and the second information, are to:
compare the first data usage information and the second data usage information, and
identify a set of values indicating the data usage pattern based on comparing the first data usage information and the second data usage information,
the set of values indicating application-specific data usage for one or more user devices included in the first group of user devices and application-specific data usage for one or more user devices included in the second group of user devices.

4. The analysis device of claim 1, where the one or more processors, when analyzing the first information and the second information, are to:
compare fee information associated with the first group of user devices and fee information associated with the second group of user devices,
identify a set of values indicating a revenue generation pattern based on comparing the fee information associated with the first group of user devices and the fee information associated with the second group of user devices,
the set of values being associated with an amount of revenue generated by data usage of one or more user devices included in the first group of user devices and an amount of revenue generated by data usage of one or more user devices included in the second group of user devices.

5. The analysis device of claim 1, where the one or more processors, when analyzing the first information and the second information, are to:
compare the first information and the second information,
the first information including at least one of:
first subscriber profile information, or
first survey information, and
the second information including at least one of:
second subscriber profile information, or
second survey information, and
determine that the first information satisfies a threshold based on comparing the first information and the second information,
the threshold including at least one of:
a data usage threshold, or
a user satisfaction threshold associated with a user satisfaction rating; and
wherein the one or more processors, when performing the actions, are to:
perform the actions based on determining that the first information satisfies the threshold.

6. The analysis device of claim 1, where the one or more processors, when modifying the pilot data plan or the live data plan, are further to:
modify the pilot data plan by modifying one or more pilot data plan parameters,
the one or more pilot data plan parameters including at least one of:
a data limit parameter,
a time parameter, or
a revenue parameter, or
modify the live data plan by modifying one or more live data plan parameters, the one or more live data plan parameters including at
least one of:
a data limit parameter,
a time parameter, or
a revenue parameter.
7. The analysis device of claim 1, where the one or more processors, when identifying the one or more user accounts, are further to:
identify the one or more user accounts using the data model,
the one or more user accounts sharing demographic information with one or more other user accounts that are associated with the first group of user devices; and
wherein the one or more processors, when transmitting the information relating to the modified pilot data plan or the modified live data plan, are to:
transmit a recommendation, via the web portal device, to one or more user devices that are associated with the one or more user accounts to enroll in the modified pilot data plan.
8. A non-transitory computer-readable medium storing instructions, the instructions comprising:
one or more instructions that, when executed by one or more processors of an analysis device, cause the one or more processors to:
receive, from a set of unprocessed data storage devices included in a data plan management platform associated with the analysis device, first information relating to one or more pilot data plans,
where the set of unprocessed data storage devices received the first information from at least two of:
a home subscriber server/authentication, authorization, and accounting server (HSS/AAA),
at least one content device that collects at least a portion of the first information as an intermediary between the data plan management platform and user devices, or
a data collection device included in the data plan management platform,
the one or more pilot data plans being associated with one or more first groups of user devices,
the one or more pilot data plans being one or more plans for which at least one of data usage information, subscriber profile information, or survey information, is tracked for devices enrolled in the one or more pilot data plans, and
the first information including:
first data usage information specifying network data consumption for the one or more first groups of user devices,
the first data usage information specifying first data usage attributable to an application category, of a plurality of application categories, associated with one or more first applications used by the one or more first groups of user devices;
receive, from the set of unprocessed data storage devices, second information relating to one or more live data plans,
where the unprocessed data storage device received the second information from at least two of:
the HSS/AAA,
the at least one content device, or
the data collection device,
the one or more live data plans being associated with one or more second groups of user devices, the one or more second groups of user devices being different than the one or more first groups of user devices, and
the second information including second data usage information specifying network data consumption for the one or more second groups of user devices,
the second data usage information specifying second data usage attributable to the application category, of the plurality of application categories, associated with one or more second applications used by the one or more second groups of user devices;
analyze, using in-memory computing and one or more memories associated with the one or more processors, the first information and the second information to generate processed data identifying one or more patterns of information,
the one or more patterns including:
a data usage pattern identifying similarities between the first data usage attributable to the application category and the second data usage attributable to the application category, and
a user interest pattern indicating differences in measures of user interest with respect to the one or more pilot data plans and the one or more live data plans;
store the processed data in at least one processed data storage device included in the data plan management platform associated with the analysis device;
generate, using the one or more patterns, a data model;
receive, via a web portal device in communication with the data plan management platform, a request associated with the processed data;
determine, using the data model, based on the request, and using in-memory computing and the one or more memories, actions to perform associated with at least one of the pilot data plan or the live data plan; and
perform the actions,
the actions including:
generating a new data plan,
identifying one or more user accounts as candidates for the new data plan, and
transmitting, via the web portal device and to at least one user device in the one or more first groups of user devices or at least one user device in the one or more second groups of user devices, information relating to the new data plan.
9. The non-transitory computer-readable medium of claim 8, where the one or more instructions, that cause the one or more processors to analyze the first information and the second information, cause the one or more processors to:
compare the first data usage information and the second data usage information,
determine that one or more user devices included in the first groups of user devices satisfy a threshold amount of data usage, and
identify a set of values indicating the data usage pattern based on determining that the one or more user devices satisfy the threshold amount of data usage,
the set of values including at least one of:
a value indicating total data usage,
one or more values indicating application-specific data usage, or one or more values indicating a portion of data usage attributable to respective categories of applications.

10. The non-transitory computer-readable medium of claim 8, where the one or more instructions, that cause the one or more processors to analyze the first information and the second information, cause the one or more processors to:
compare demographic information associated with the one or more first groups of user devices and demographic information associated with the one or more second groups of user devices,
determine that a demographic information associated with one or more user devices included in the first groups of user devices satisfies a threshold level of similarity,
identify a set of values indicating a demographic information pattern based on determining that the demographic information associated with the one or more user devices satisfies the threshold level of similarity, the set of values including at least one of:
a value indicating an age,
a value indicating a gender,
a value indicating a location, or
a value indicating an income.

11. The non-transitory computer-readable medium of claim 8, where the one or more instructions, that cause the one or more processors to analyze the first information and the second information, cause the one or more processors to:
identify a set of values indicating the one or more patterns;
wherein the one or more instructions, that cause the one or more processors to generate the data model, cause the one or more processors to:
generate the data model using the set of values; and
wherein the one or more instructions, that cause the one or more processors to determine the actions, cause the one or more processors to:
provide a set of data values as input to the data model, the set of data values being associated with a user device included in the one or more first groups of user devices; and
determine at least one action, of the actions, based on output from the data model.

12. The non-transitory computer-readable medium of claim 8, where the one or more instructions, that cause the one or more processors to generate the new data plan, further cause the one or more processors to:
generate the new data plan based on an output of the data model; and
where the one or more instructions, that cause the one or more processors to transmit the information relating to the new data plan, further cause the one or more processors to:
transmit the new data plan to a user device included in the one or more first groups of user devices.

13. The non-transitory computer-readable medium of claim 8, where the one or more instructions, that cause the one or more processors to perform the actions, cause the one or more processors to:
generate a work order associated with the new data plan,
analyze one or more sales representative calendars and one or more sales representative qualifications,
schedule an appointment with a sales representative based on analyzing the one or more sales representative calendars and the one or more sales representative qualifications,
the appointment allowing the sales representative to recommend the new data plan to a user,
transmit the work order to a device associated with the sales representative, and
establish a connection between the device associated with the sales representative and a user device to initiate a sales call.

14. A method, comprising:
receiving, by an analysis device and from a set of unprocessed data storage devices included in a data plan management platform associated with the analysis device, first information relating to one or more pilot data plans,
where the set of unprocessed data storage devices received the first information from at least two of:
a home subscriber server/authentication, authorization, and accounting server (HSS/AAA),
at least one content device that collects at least a portion of the first information as an intermediary between the data plan management platform and user devices, or
a data collection device included in the data plan management platform,
the one or more pilot data plans being associated with one or more first groups of user devices,
the one or more pilot data plans being one or more plans for which at least one of data usage information, subscriber profile information, or survey information, is tracked for devices enrolled in the one or more pilot data plans, and
the first information including:
first data usage information specifying network data consumption for the one or more first groups of user devices,
the first data usage information specifying first data usage attributable to an application category, of a plurality of application categories, associated with one or more first applications used by the one or more first groups of user devices;
analyzing, by the analysis device and using in-memory computing and one or more memories of the device, the first information to generate processed data identifying one or more patterns of information,
the one or more patterns including:
a data usage pattern based on the first data usage attributable to the application category, and
a user interest pattern indicating based on measures of user interest with respect to the one or more pilot data plans;
storing, by the analysis device, the processed data in at least one processed data storage device included in the data plan management platform associated with the analysis device;
generating, by the analysis device and using the one or more patterns, a data model;
receiving, by the analysis device and via a web portal device in communication with the data plan management platform, a request associated with the processed data;
determining, by the analysis device, based on the request, using the data model, and using in-memory computing and the one or more memories of the device, actions to perform associated with the one or more pilot data plans; and
performing, by the analysis device, the actions,
the actions including:
modifying a pilot data plan of the one or more pilot data plans or generating a new data plan, identifying one or more user accounts as candidates for the modified pilot data plan or for the new data plan, and transmitting, via the web portal device and to at least one user device in the one or more first groups of user devices, information relating to the modified pilot data plan or the new data plan.

15. The method of claim 14, further comprising:

receiving, from the set of unprocessed data storage devices, second information relating to one or more live data plans, the one or more live data plans being associated with one or more second groups of user devices, and the second information including second data usage information specifying network data consumption for the one or more second groups of user devices, the second data usage information specifying second data usage attributable to the application category, of the plurality of application categories, associated with one or more second applications used by the one or more second groups of user device;

analyzing the second information to identify one or more other patterns of information;

modifying a live data plan of the one or more live data plans based on analyzing the second information to identify the one or more other patterns of information;

identifying one or more user accounts as candidates for the modified live data plan; and transmitting, to one or more user devices associated with the one or more user accounts, information relating to the modified live data plan.

16. The method of claim 14, where analyzing the first information comprises:

comparing information relating to user interests for the one or more first groups of user devices, the information relating to user interests being included in the first information, identifying a set of values indicating the user interests pattern, included in the one or more patterns, based on comparing the information relating to user interests for the one or more first groups of user devices, the set of values including at least one of:
  a value indicating a user satisfaction rating,
  a value indicating a total number of users enrolled in the pilot data plan of the one or more pilot data plans,
  a value indicating a number of users enrolling in the pilot data plan over a time period, or
  a value indicating a number of users departing from the pilot data plan over a time period.

17. The method of claim 14, where analyzing the first information comprises:

comparing the data usage information associated with the one or more first groups of user devices, identifying a set of values indicating the data usage pattern based on comparing the data usage information associated with the one or more first groups of user devices, the set of values being associated with category-specific data usage for one or more user devices included in the one or more first groups of user devices.

18. The method of claim 14, where analyzing the first information comprises:

sorting the first group of user devices by a set of categories, the set of categories being associated with one or more of the data usage information, the subscriber profile information, or the survey information, determining that one or more categories of the set of categories satisfies a threshold level of similarity, and identifying a set of values indicating a pattern based on determining that the one or more categories satisfies the threshold level of similarity.

19. The method of claim 18, where performing the actions comprises:

modifying the pilot data plan after identifying the set of values indicating the pattern, identifying one or more user accounts as candidates for the modified pilot data plan, the one or more user accounts sharing the data usage information, the subscriber profile information, or the survey information with one or more user devices of the first group of user devices, and transmitting a recommendation to the at least one user device to enroll in the modified pilot data plan.

20. The method of claim 14, where performing the actions further comprises:

receiving, from the web portal device, a request for a set of values associated with the data usage information, the subscriber profile information, or the survey information, and transmitting, for display at the other web portal device, the set of values.

* * * * *